United States Patent
Perkins et al.

(10) Patent No.: US 7,009,934 B1
(45) Date of Patent: Mar. 7, 2006

(54) METHOD AND APPARATUS FOR REROUTING AN OPTICAL NETWORK UPON FAULT

(75) Inventors: Drew D. Perkins, Saratoga, CA (US); Theodore E. Tedijanto, San Jose, CA (US); Neeraj Gulati, Cupertino, CA (US); Biao Lu, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/259,263

(22) Filed: Mar. 1, 1999

(51) Int. Cl.
*G06F 11/00* (2006.01)

(52) U.S. Cl. ........................................ 370/228; 370/237
(58) Field of Classification Search ................ 370/237, 370/238, 254, 255, 351, 400, 216, 219, 221, 370/222, 223, 227, 228
See application file for complete search history.

(56) References Cited

U.S. PATENT DOCUMENTS

| | | | | |
|---|---|---|---|---|
| 5,319,632 A | * | 6/1994 | Iwasaki | 370/228 |
| 5,412,652 A | * | 5/1995 | Lu | 370/223 |
| 5,495,471 A | * | 2/1996 | Chow et al. | 370/221 |
| 5,687,168 A | | 11/1997 | Iwata | |
| 5,793,745 A | * | 8/1998 | Manchester | 370/224 |
| 5,796,718 A | * | 8/1998 | Caterisano | 370/217 |
| 5,805,578 A | | 9/1998 | Stirpe et al. | |
| 5,835,482 A | * | 11/1998 | Allen | 340/2.23 |
| 5,930,236 A | * | 7/1999 | Havansi | 370/254 |
| 6,047,331 A | * | 4/2000 | Medard et al. | 709/239 |
| 6,061,335 A | * | 5/2000 | De Vito et al. | 370/223 |
| 6,122,753 A | * | 9/2000 | Masuo et al. | 370/217 |
| 6,141,318 A | * | 10/2000 | Miyao | 370/217 |
| 6,282,170 B1 | * | 8/2001 | Bentall et al. | 370/225 |
| 6,356,564 B1 | * | 3/2002 | Bawa et al. | 370/254 |
| 6,389,015 B1 | * | 5/2002 | Huang et al. | 370/376 |
| 6,498,778 B1 | * | 12/2002 | Cwilich et al. | 370/216 |

FOREIGN PATENT DOCUMENTS

| | | |
|---|---|---|
| EP | 0841824 | 5/1998 |
| EP | 0845919 A | 6/1998 |

OTHER PUBLICATIONS

Veitch, P., et al., "ATM Network Resilience" IEEE Network: The Magazine of Computer Communications, U.s., IEEE, Inc., New York, vol. 11, No. 5, pp. 26–33, 1997.

Veitch, P., et al., "Restoration Strategies" Electronics and Communication Engineering Journal, GB, Institution of Electrical Engineers, London, vol. 7, No. 3, pp. 97–103, 1995.

* cited by examiner

*Primary Examiner*—Chi Pham
*Assistant Examiner*—Keith M. George

(57) ABSTRACT

A system and method for automatically generating a topology of a network having synchronous optical network (SONET) switches. Switches in the network pass information about itself to other switches in the network so that every switch can maintain a topology of the network. Using this knowledge of the network topology, each switch can generate a communication route within the network and automatically allot bandwidth for the route. Each switch may generate a new route in response to a line failure.

12 Claims, 8 Drawing Sheets

METHOD AND APPARATUS FOR REROUTING AN OPTICAL NETWORK UPON FAULT

BACKGROUND OF THE INVENTION

The present invention relates to a method and system for generating a topology of a fiberoptic network of synchronous optical network (SONET) switches and for routing signals through the network.

Networks, both computer and telephone, have been around for many years. As the use of networks increased over time, so has the need for more bandwidth. Fiberoptic networks were developed to meet this need and transmit at high data rates. SONET was developed to be a standard for fiberoptic transmission.

An example, current SONET network is shown in FIG. 1. The nodes in this network have no information about other nodes in the network. Nodes are typically add/drop multiplexors (ADM). This network requires a system administrator to set up connection routes between port A 100 and port B 150 through ADMs 110–140. The system administrator may program the route to be from origination switch 110 through intermediate switch 120 to the destination switch 130, and must program each switch to pass information in this manner. If a failure occurs in any one of the connections, the system administrator must manually reroute the connections by reprogramming the switches. Therefore, in order to provision each of the switches in a SONET network it takes days for the network managers to insert all of the needed information.

Current SONET networks have line-level protection that provides protection lines for rerouting information when a working line fails. FIG. 1 shows working lines as solid lines an protection lines as dotted lines. If a working line fails the corresponding protection line is used to transmit information.

In the SONET environment, there currently does not exist any way to automatically create a topology of the network and generate a route between port A 100 and port B 150. In addition, current SONET networks do not provide any way of re-routing connections automatically due to a failed line.

SUMMARY OF THE INVENTION

A system and method consistent with this invention automatically generates a topology of a network of synchronous optical network switches by including steps or structure for sending a registration message from a first switch in the network to neighboring switches. The first switch receives messages from the neighboring switches identifying other switches in the network. From these messages the first switch determines the topology of the network.

Another system and method consistent with this invention automatically generates a route between synchronous optical network switches by receiving a selection of an origination switch and a destination switch, automatically selecting a route to pass messages from the origination switch to the destination switch through an intermediate switch, and sending a connect message from the origination switch to the destination switch through the intermediate switch.

Another system and method consistent with this invention automatically generates a route between an originating optical network switch and a destination optical network switch in response to a line failure by receiving notice of a line failure, determining whether the line failure affects a current route between an origination switch and a destination switch, automatically selecting a new route to pass messages from the origination switch to the destination switch through an intermediate switch, and sending a connect message from the origination switch to the destination switch through the intermediate switch.

Both the foregoing general description and the following detailed description explain examples of the invention and do not, by themselves, restrict the scope of the appended claims. The accompanying drawings, which constitute a part of this specification, illustrate systems and methods consistent with the invention and, together with the description, help explain the principles of the invention.

BRIEF DESCRIPTION OF THE DRAWINGS

The accompanying drawings, which are incorporated in and constitute a part of this specification, illustrate embodiments of the invention and, together with the description, serve to explain the advantages of the invention. In the drawings.

DETAILED DESCRIPTION OF THE INVENTION

The following detailed description refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention automatically create a topology of a SONET network and generate routes between switches.

Figure 1:
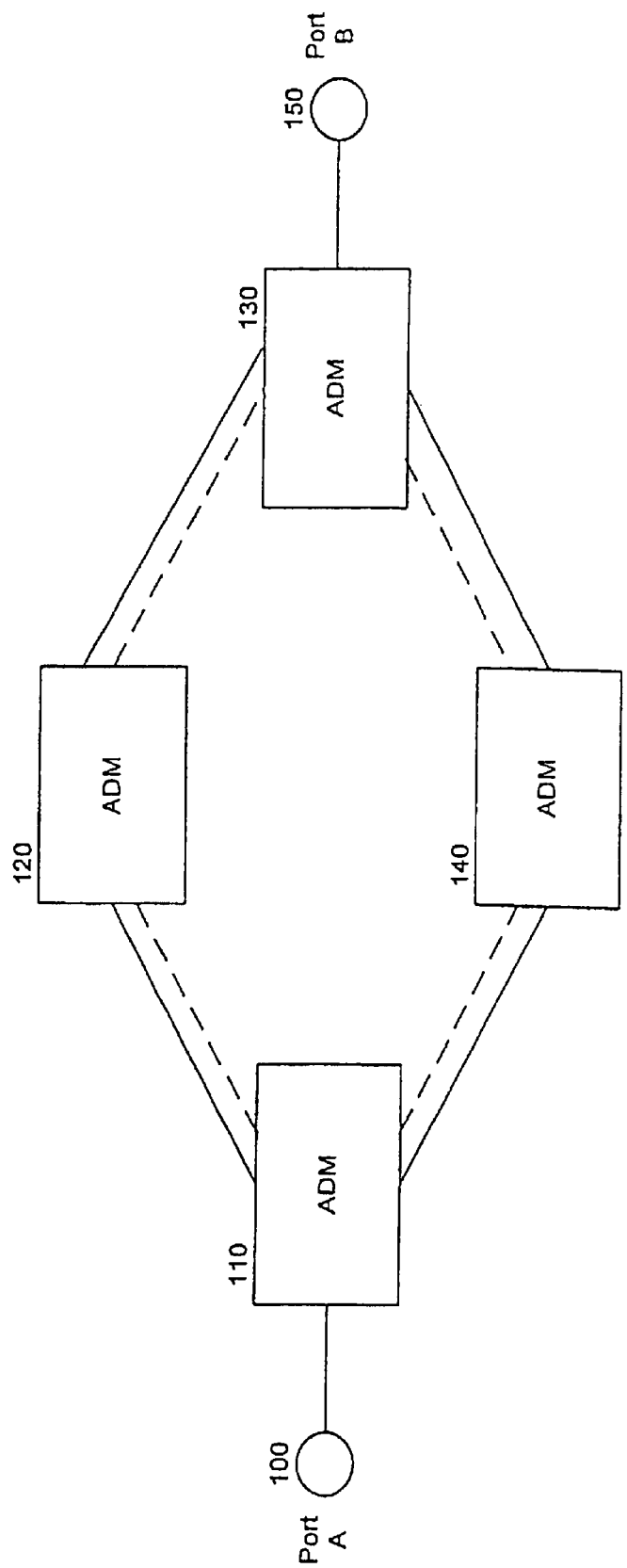
FIG. 1 shows an example SONET network according to the prior art.
Figure 2:
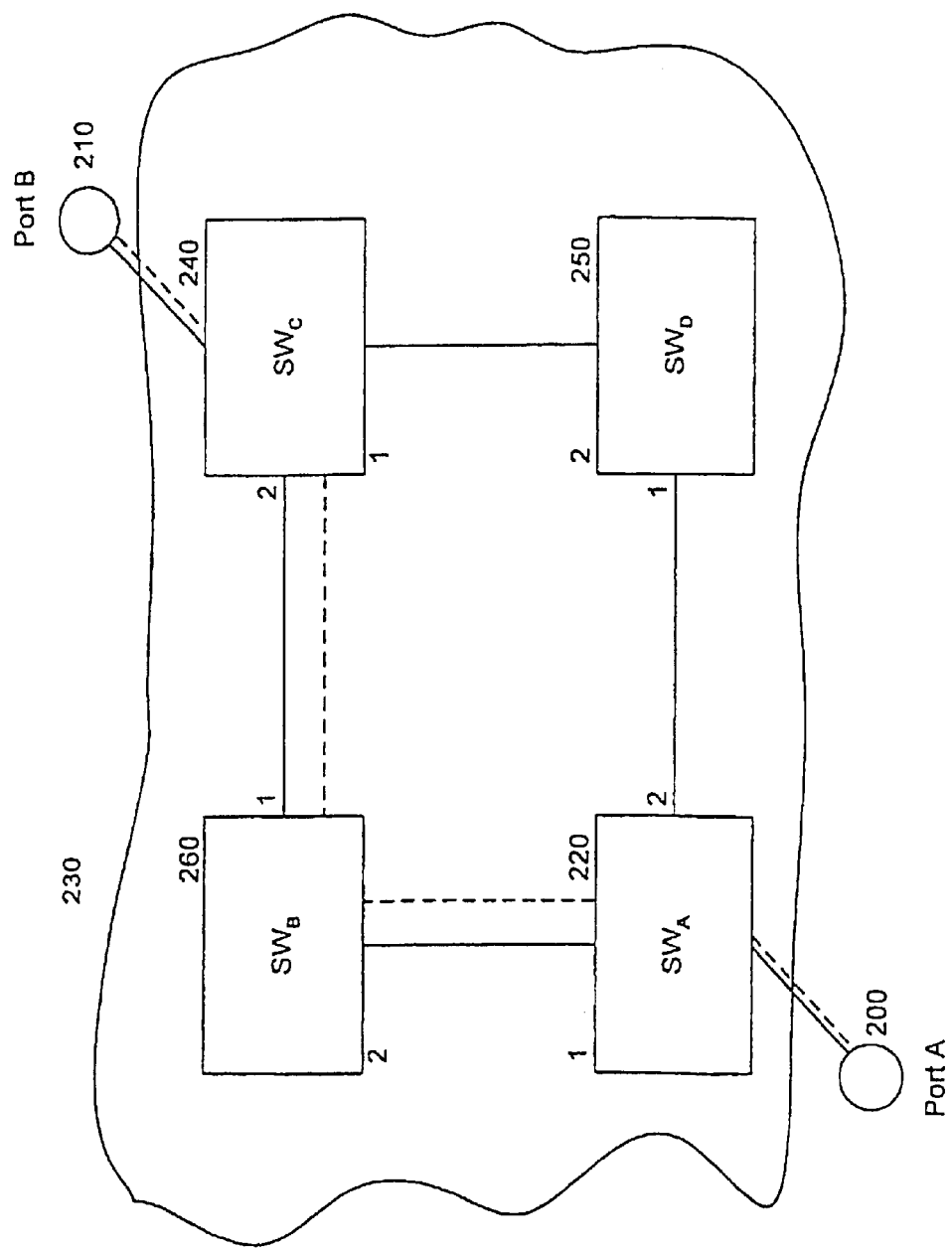
FIG. 2 shows a SONET network consistent with the present invention.

FIG. 2 shows a SONET network 230 including a plurality of switches 240–260. When network 230 is first initialized, each switch in network 230 automatically learns information about the other switches in the network so that routes between ports 200 and 210 may be automatically generated.

Figure 3:
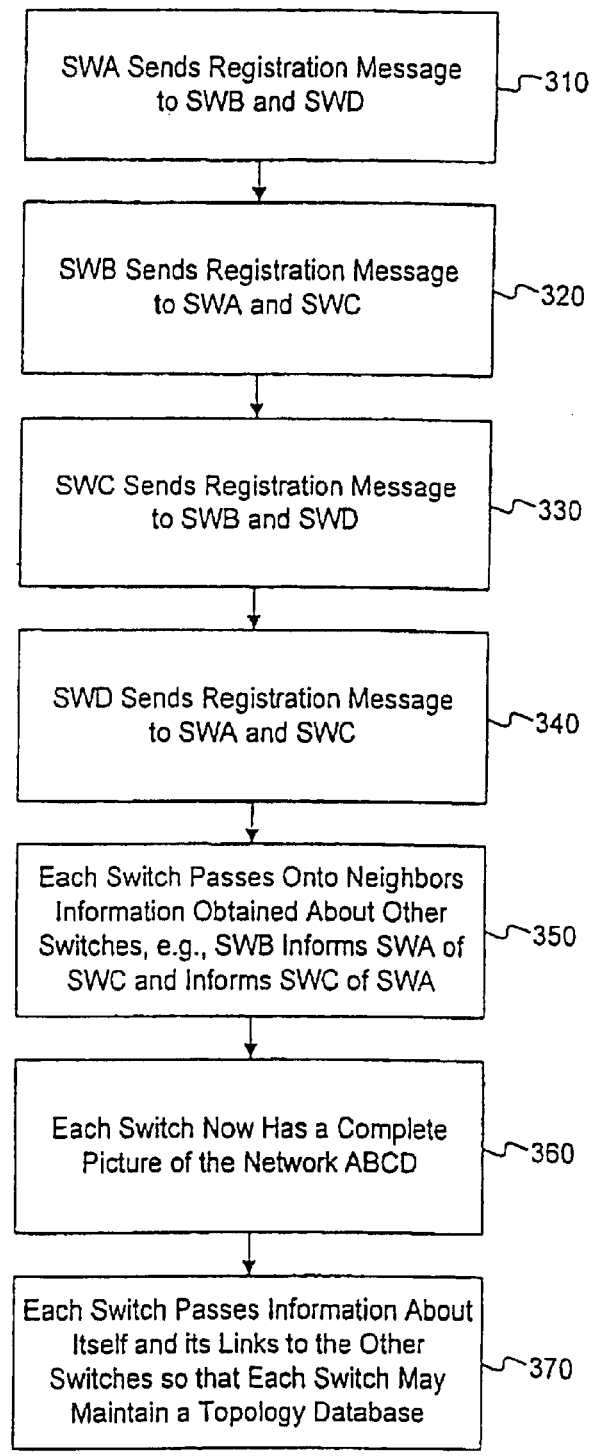
FIG. 3 show the steps of automatically generating a network topology at each switch in the network.

FIG. 3 shows the steps 300 carried out by processors and software in the switches, to pass information from switch to switch so that each switch has information needed for routing. Using the example network in FIG. 2, switch A 220 sends a registration message to switch B 260 and switch D 250 informing these switches that switch A is an immediate neighbor (step 310). Similarly, switch B 260 sends a registration message to switch A 220 and switch C 240 informing these switches that switch B is their neighbor (step 320). Switch C 240 sends a registration message to switch B 260 and switch D 250 (step 330). Finally, switch D 250 sends a registration message to switch A 220 and switch C 240 (step 340). Each switch passes onto their neighbors information obtained from other switches (step 350). For example, switch A knows that it has neighbors B and D from steps 320 and 340. However, switch A does not yet know about switch C 240. Accordingly, both switch B 260 and switch D 250 will inform switch A about their other neighbors such as switch C 240. Each switch now has a complete picture of the network, namely A, B, C, D, in a topology database (step 360). Each switch may also pass additional information about itself and associated links to other switches so that each switch may maintain more complete information in the topology database (step 370).

Figure 4:
FIG. 4 shows an example topology database stored at each switch in the network.

FIG. 4 shows an example topology database 400 stored at each switch. The topology database 400 includes information describing the relationship between switches in the network. Also included is information on each interface line in the network. Using the example in FIG. 2, each switch has interface lines 1 and 2 which are physical fiberoptic lines that transmit information. Interface lines are the logical lines associated with a switch and not the physical lines. For protection, each interface line may have an associated protection line which is an alternative connection between two switches. The level of protection is used to designate which route or connection should have priority when using a given protected line. Entry 410 of database 400 corresponds to switch A 220 and includes for each interface line at the switch, the maximum bandwidth, the available bandwidth, the propagation delay associated with that interface, the weight or administrative cost assigned to the interface by an operator, and the protection level. This list of information about the interfaces is obtained for the database during step 370 of FIG. 3.

Figure 5:
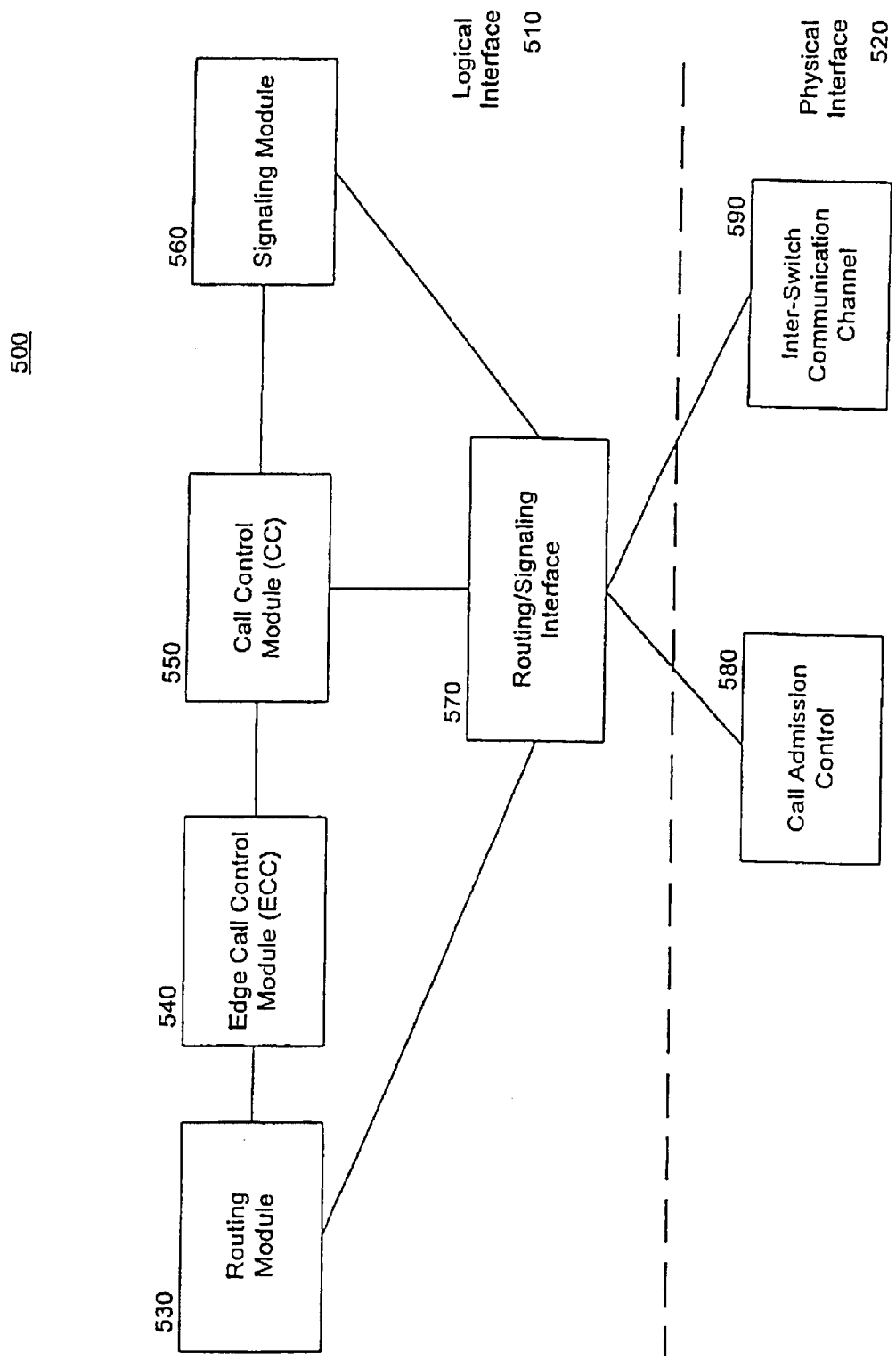
FIG. 5 shows a block diagram of the internal construction of a switch according to the present invention.

FIG. 5 shows the internal configuration of a switch 500. The switch is functionally broken into two sections, a logical interface 510 and a physical interface 520. Physical interface 520 relates to actual physical lines that connect switches. There is typically a bundle of lines between switches where the lines are optical fibers. The logical interface 510 is not aware of the multiple links that create the bundles of physical connections. Routing/signaling interface 570 in logical interface 510 provides this level of abstraction and is used to link the physical lines in the physical interface 520 to the logical lines in logical interface 510. The modules of logical interface 510 need only know that connection lines exist between two switches and does not need to know the details about the lines providing this connection.

Physical interface 520 includes a call admission control 580 and an inter-switch communication channel 590. Call admission control 580 has physical control of every signal line that reaches switch 500. Inter-switch communication channel (ISCC) 590 directs communications over these physical lines and monitors these lines. ISCC 590 subsystem provides a reliable messaging channel for each logical line. When a message is received from a physical line associated with a logical line, ISCC 590 passes the message, with a label identifying the logical line, to the routing/signaling interface 570. Routing/signaling interface 570 passes the message up to the proper message handler in the logical interface 510.

Logical interface 510 includes modules with software, carried out by a processor located at the switch, including routing module 530, edge call control module (ECC) 540, call control module (CC) 550, signaling module 560, and a routing/signaling interface 570. Routing module 530 generates a route through the lines from switch 500 to another switch. ECC 520 is only utilized at the first and last switches in a route and is responsible for scheduling the setup/restoration of origination and termination connections and maintaining information on a call route. CC 550 generates control information for designating which switch is next in a route and the information to be passed to that switch. Signaling module 560 generates signals for passing between the switches. Routing/signaling interface 570 formats information for sending to the physical interface 520.

Figure 6:
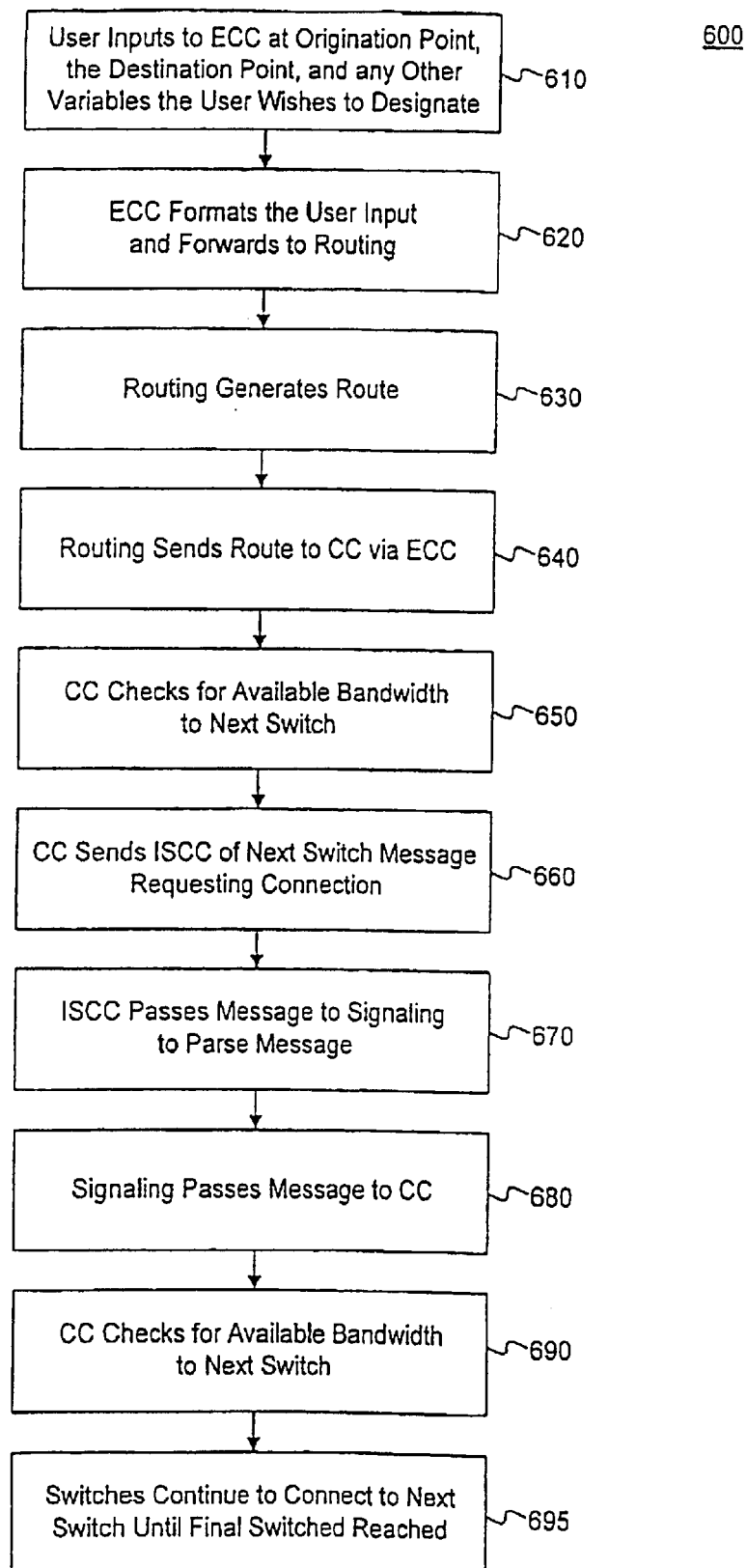
FIGS. 6 and 7 show steps for automatically generating a call connection route creating a topology consistent with the present invention.

FIG. 6 shows the steps 600 for generating and logically creating a route between switches. First, a user inputs to ECC 540 at switch 500, an origination point, such as switch A 220 in FIG. 2, a destination point, such as switch C 240 in FIG. 2, and any other variables a user wishes to designate (step 610). For example, a user may wish to designate the connection type and size, the end point addresses, port numbers or channel numbers, the delay requirement, protection level, and protection priority. ECC 540 formats this user input and forwards the connection request to routing module 530 (step 620). Routing module 530 generates a route from the origination point to the destination point through switches in the network (step 630). Routing module 530 generates the route using the topology database 400 which informs the switch of the configuration of the network and the interface lines between each switch in the network. Routing module 530 will select a route that meets any user specified variables or any default variables. Routing module 530 sends the resulting route to CC 550 via ECC 540 (step 640). CC 550 checks for available bandwidth between this switch and a next switch in the route (step 650). CC 550 is either provided with the amount of bandwidth needed by input from the user in step 610 or based on a default bandwidth value. CC 550 determines whether the needed bandwidth is available by querying call admission control 580 via the routing/signaling interface 570 to determine how much bandwidth is available. Assuming the needed bandwidth is available, CC 550 sends a message requesting connection through the ISCC 590 of this switch to the next switch in the route (step 660). ISCC 590 at the next switch passes this received message to its signaling module 560 to parse the message (step 670). Signaling 560 passes the parsed message to CC 550 (step 680). CC 550 checks for whether there is available bandwidth between the current switch and the next switch in the route (step 690) as was done by the last switch in step 650. Each switch in the route is sequentially logically connected to the next switch in the route and each performs the steps of checking for bandwidth to the next switch until the final switch is reached (step 695).

Figure 7:
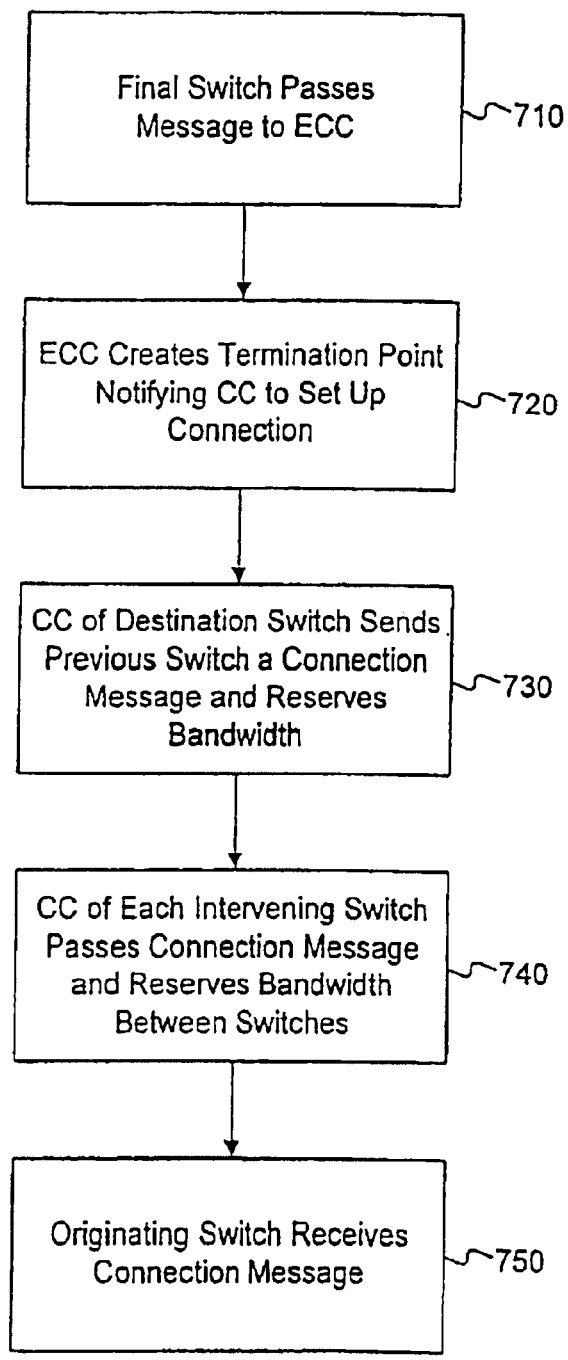

FIG. 7 shows the final steps 700 for generating a route. The final switch in the route passes the received message requesting connection to its ECC 540 (step 710). ECC 540 of the final switch creates a termination point at this switch and notifies CC 550 to set up the connection that has only been logically formulated to this point (step 720). CC 550 of the final destination switch sends the previous switch in the route a connection message and reserves the bandwidth that was already indicated as being available (step 730). CC 550 of each intervening switch between the destination switch and the origination switch passes this connection message and reserves the bandwidth between the switches (step 740). When the origination switch finally receives the connection message the connection set up is complete (step 750).

After a call connection is successfully established, ECC 540 at the originating and terminating switches stores information needed to recreate this connection in persistent storage. CC 550 stores information on each of the physical connections to this switch. Therefore, if the system is restarted, ECC 540 at each switch can rebuild the connections that originate or terminate at this switch. CC 550 rebuilds all connections that traverse the switch.

In one embodiment, the computation of a route may also include calculating a protection connection route. The protection route is a route to use if an error occurs in the main working connection. The protection route should be selected as disjoint as possible from the working route. If it is not possible to have a completely disjoint working route, more than one protection route may be computed and the combination of protection routes together will protect the working route.

In another embodiment, hello messages are sent on a regular basis between neighbor switches. Hellos are transmitted by each switch over all physical links to immediate neighbor switches. The purpose of exchanging the hellos is to establish the state of the links between neighbors. The hellos are sent to discover and verify the identity of neighbor switches and determine the status of the links to those switches. A hello message will include for example, the operational status of links to the sending switch and identification of other switches attached to the sending switch besides the receiving switch. If a hello message is not received within a given period of time, a switch will presume that a link to the neighbor switch is down. If no hellos are received over a period of time, attempts are made to contact the non-communicating switch periodically. If a line is down, the routing module 550 of an original switch may elect to generate a new route for any connections using the down line.

Figure 8:
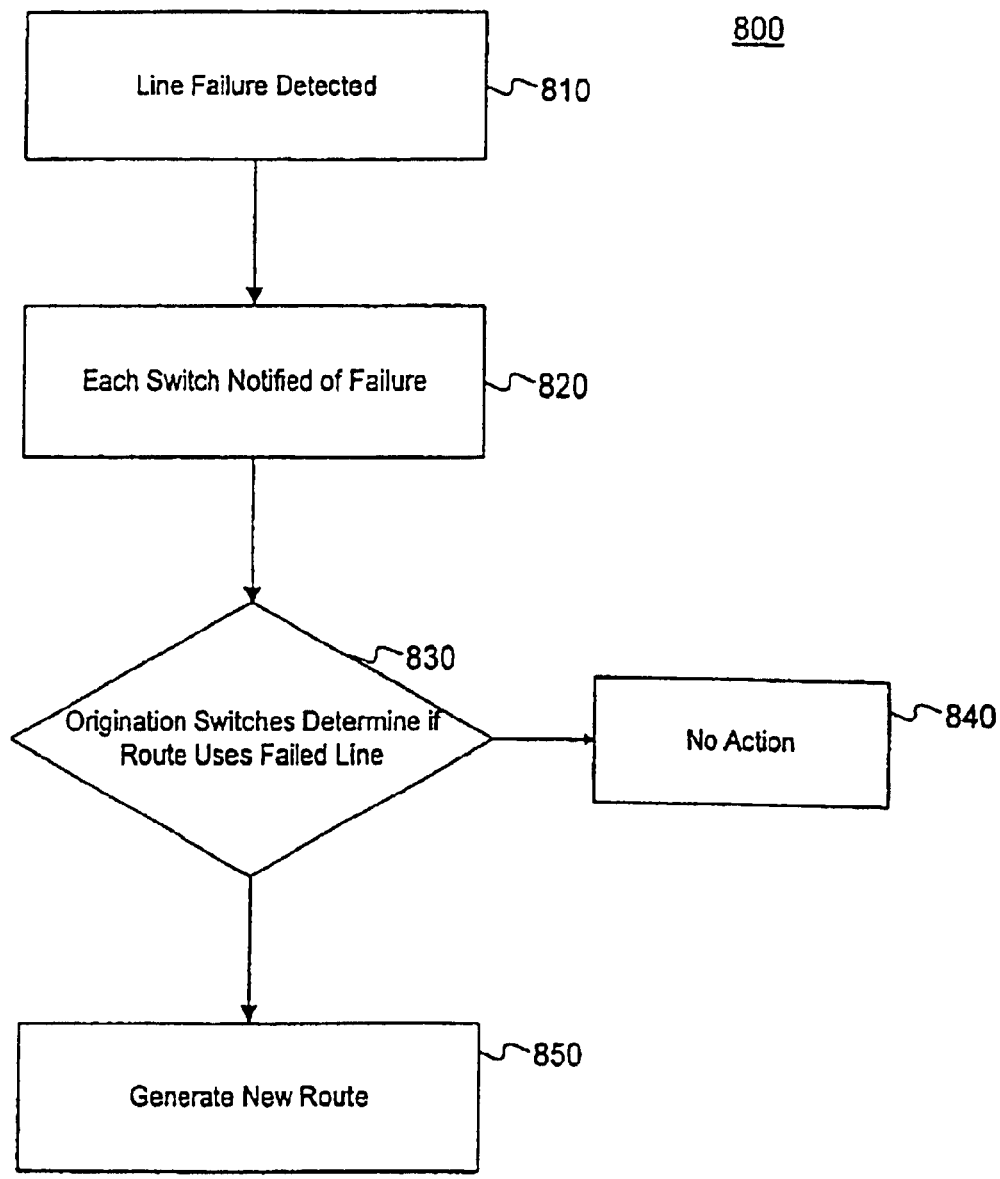
FIG. 8 shows the steps for generating a new route in response to a line error.

FIG. 8 shows the steps 800 for generating a new route in case of line failure. If any switch detects line failure (step 810), then each switch is notified of the failed line (step 820). All switches check the routes that originate at that switch to determine if the failed line is being utilized (step 830). If the line is not used, the switch takes no action (step 840). If a route at an origination switch uses the failed line then a new route is generated using the basic steps of FIGS. 6 and 7 (step 850).

In another embodiment of the present invention, a routing module 530 at the origination switch may periodically try to calculate a better route to the destination switch, such as a faster route. When a better route is found the origination switch may request a call reroute.

In yet another embodiment, the assignment of bandwidth may be based on assigned priority levels. For example, one connection may have a lower priority than another connection because one is a working connection and one is a protection connection. When a new connection request cannot be accommodated without bumping an existing connection, a bumping coordinator makes the decision about which, if any, connections should be bumped using the priority of each connection or bumping policies specified by the user.

In conclusion, systems and methods consistent with this invention provide for automatic creation of a topology of switches in a SONET network and for the automatic generation of routes through a SONET network.

It will be apparent to those skilled in the art that various modifications and variations can be made to the SONET network routing systems consistent with the present invention, and in construction of a network using such systems, without departing from the scope or spirit of the invention.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for automatically generating a route between an originating optical network switch and a destination optical network switch in response to a line failure, comprising:

receiving, at the originating optical switch, notice of a line failure;

determining, at least at the originating optical switch, whether the line failure affects a current route between the originating optical network switch and the destination optical network switch;

automatically selecting a new route to pass messages from the originating optical network switch to the destination optical network switch through an intermediate optical network switch based on a pre-existing topology database stored in the optical network switches;

sending a connection request message requesting a connection along the new route selected by said selecting step from the originating optical network switch to the destination optical network switch through the intermediate optical network switch, wherein the connection request message requests a connection along the new route in order to set up a logical connection along the new route;

sending a connection message in response to the connection request message from the destination optical network switch to the originating optical network switch, wherein the step of sending a connection message comprises:

directing the intermediate optical network switch and the originating optical network switch to reserve bandwidth for the new route between the originating optical network switch and destination optical network switch.

2. The method according to claim 1 wherein the step of sending a connection request message includes:

determining whether bandwidth is available along the new route between the originating optical network switch, the intermediate optical network switch and the destination optical network switch.

3. The method according to claim 1 wherein the step of automatically selecting includes:

reading the pre-existing topology database listing the optical network switches in the network, including optical interface connection relationships to other optical network switches in the network, available bandwidth, maximum bandwidth, protection level, weight, and delay; and selecting the intermediate optical network switch from the pre-existing topology database for the new route between the originating optical network switch and the destination optical network switch.

4. The method according to claim 1, further comprising reserving bandwidth for the new route based on assigned priority levels stored in the topology database.

5. The method according to claim 1, further comprising creating a termination point for the new route in the destination optical network switch when the destination optical network switch receives the connection request message.

6. A system for automatically generating a route between an originating optical network switch and a destination optical network switch in response to a line failure, comprising:

means for receiving, at the originating optical network switch, notice of a line failure;

means for determining, at least at the originating optical network switch, whether the line failure affects a current route between the originating optical network switch and the destination optical network switch;

means for automatically selecting a new route to pass messages from the originating optical network switch to the destination switch optical network through an intermediate optical network switch based on a pre-existing topology database stored in the optical network switches;

means for sending a connection request message requesting a connection along the new route from the originating optical network switch to the destination optical network switch through the intermediate optical network switch, wherein the connection request message requests a connection along the new route in order to set up a logical connection along the new route;

means for sending a connect message in response to the connection request message from the destination optical network switch to the originating optical network switch through the intermediate optical network switch, wherein the means for sending a connect message further comprises:

means for directing the intermediate optical network switch and the originating optical network switch to reserve bandwidth for the new route between the originating optical network switch and the destination optical network switch.

7. The system according to claim 6 wherein the means for sending a connection request message further includes:

means for determining whether bandwidth is available along the new route between the originating optical network switch, the intermediate optical network switch and the destination optical network switch.

8. The system according to claim 6 wherein the means for automatically selecting includes:

means for reading the pre-existing topology database listing the optical network switches in the network, including optical interface connection relationships to other optical network switches in the network, available bandwidth, maximum bandwidth, protection level, weight, and delay; and means for selecting the intermediate optical network switch from the pre-existing topology database for the new route between the originating optical network switch and the destination optical network switch.

9. A system for establishing a new route in an optical communications network in response to a line failure, comprising:

an originating optical network switch;

a destination optical network switch operatively connected to said originating optical network switch;

wherein a current route is established between the originating optical network switch and the destination optical network switch, said originating optical network switch and said destination optical network switch each including a topology database storing information describing the optical communications network;

said originating optical network switch, in response to receiving notice of a line failure, determining whether the line failure affects the current route;

said originating optical network switch automatically selecting a new route between said originating optical network switch and said destination optical network switch based on the topology database;

said originating optical network switch sending a connection request message requesting a connection along the new route, wherein the connection request message requests a connection along the new route in order to set up a logical connection between said originating optical network switch and said destination optical network switch, said destination optical network switch, in response to receiving the connection request message, sending a connection message to the originating optical network switch along the new route, said optical network switches, including said originating optical network switch, said destination optical network switch and the at least one intermediate optical network switch reserving bandwidth between pairs of said optical network switches for the new route in response to receiving the connection message.

10. The system according to claim 9, wherein the new route passes through at least one intermediate optical network switch, said optical network switches, including said originating optical network switch, said destination optical network switch and the at least one intermediate optical network switch checking for available bandwidth between pairs of said optical network switches along the new route in response to receiving the connection request message.

11. The system according to claim 9, said optical network switches reserving bandwidth for the new route based on assigned priority levels stored in the topology databases.

12. The method according to claim 9, said destination optical network switch creating a termination point for the new route in response to receiving the connection request message.

* * * * *